United States Patent [19]

Erwin, Jr.

[11] 4,134,301

[45] Jan. 16, 1979

[54] COMPENSATING FUEL MEASURING SYSTEM FOR ENGINES

[76] Inventor: Curtis L. Erwin, Jr., 5805 SE. Gladstone, Portland, Oreg. 97206

[21] Appl. No.: 803,885

[22] Filed: Jun. 6, 1977

Related U.S. Application Data

[63] Continuation-in-part of Ser. No. 713,338, Aug. 11, 1976, abandoned.

[51] Int. Cl.² ............................................. G01F 9/00
[52] U.S. Cl. .................................. 73/453; 73/113; 73/119 A
[58] Field of Search ..................... 73/113, 114, 119 A, 73/453

[56] References Cited

U.S. PATENT DOCUMENTS

| | | | |
|---|---|---|---|
| 1,787,132 | 12/1930 | Orsdale | 73/453 X |
| 3,224,273 | 12/1965 | Granberg | 73/233 |
| 3,448,609 | 6/1969 | Sibeud | 73/113 |
| 3,772,915 | 11/1973 | Stamler | 73/113 X |
| 3,802,256 | 4/1974 | Formwalt | 73/113 |
| 3,831,439 | 8/1974 | Konomi | 73/113 |
| 3,949,602 | 4/1976 | Erwin, Jr. | 73/114 |
| 3,975,952 | 8/1976 | Lacher, Jr. et al. | 73/114 X |

*Primary Examiner*—Jerry W. Myracle
*Attorney, Agent, or Firm*—Eugene M. Eckelman

[57] ABSTRACT

A volumetric fuel meter is included in a fuel system whereby the measurement is compensated to express fuel flow in units of weight such as pounds, grams or in units of energy such as BTU's or calories (grams). The meter measurement is associated with an automatic compensator which compensates the measurement for variations in the gravity of the fuel. Temperature and pressure sensing devices are associated with the measuring systems. Two separate measuring systems are employed for engine fuel systems which return unburned fuel from the injector. One system employs a single volumetric meter with a bubble remover or cooler while the second system employs two volumetric meters. The present measuring system has embodiments that provide for mechanical compensation and electrical measurement and subsequent compensation of the gravity of the fuel.

41 Claims, 6 Drawing Figures

COMPENSATING FUEL MEASURING SYSTEM FOR ENGINES

REFERENCE TO PRIOR APPLICATIONS

This application is a continuation in part of application Ser. No. 713,338, now abandoned, filed Aug. 11, 1976 for COMPENSATING FUEL MEASURING MEANS FOR ENGINES.

BACKGROUND OF THE INVENTION

This invention relates to new and useful improvements in compensating fuel measuring systems for engine fuel systems.

Many users or agencies associated with fuel consumption such as engine manufacturers, the automotive industry, the American Petroleum Institute, Governmental Agencies and the like, require an accurate determination of fuel consumption in units of weight or energy. Such accuracy is difficult to accomplish because of variations in the gravity and temperature of the fuel being tested or measured. For example, there can be at least 4 percent variation in the BTU per gallon of a given fuel due to variations in the API or specific gravity of the fuel alone. An additional 6 percent variation can occur due to variations in the temperature of the fuel being measured because fuel expands and contracts with changes in temperature.

The inaccuracy resulting from these conditions has induced the use of various types of compensating charts but such charts are inconvenient to use.

The inaccuracies mentioned have also induced users to meter by weight and thus use weight-type or mass-type meters instead of volumetric-type meters. While weight-type meters are accurate and are immune to variations in temperature and gravity, they have inherent disadvantages. One is that they are complex in construction, massive in relation to volumetric-type meters, and are expensive to manufacture. Another disadvantage is that they require a relatively large quantity of fuel thru-put before an accurate determination can be assured. Volumetric-type meters, on the other hand, are relatively simple and inexpensive to manufacture and give accurate metering almost instantaneously.

SUMMARY OF THE INVENTION

According to the present invention and forming a primary objective thereof, a compensating fuel measuring system for engines is provided which combines a volumetric-type measuring means and compensating means arranged to automatically correct the measurements of the volumetric measuring means according to variations in the gravity of the fuel as related to a reference. The compensated volumetric measurement is converted to units of weight or units of energy so that the desired measurement accuracy that is required by engine manufacturers, the automotive industry, Governmental agencies and the like can be achieved.

According to such objective, a volumetric-type fuel meter is connected into the fuel system of a fuel combustion means such as an engine between the fuel tank and the engine. For engines which return unburned fuel, two volumetric meters are employed in one system while a single meter and treatment means are employed in another. Gravity compensating means is associated with the fuel system to provide automatic compensating for variations in the gravity of the fuel to correct the measurement of the volumetric measuring means. This is accomplished mechanically by by-passing fluid around the meter or electrically by compensating electronically the measurement of the measuring means. Adjustment means are available to compensate the measurement for variations in the temperature and pressure of the fuel. The present system permits the compensated measurement to be expressed in units of weight or with the aid of a programmable conversion formula in a microprocessor or electronic calculator to units of energy. A secondary objective provides an extremely precise measurement of energy by a manual adjustment associated with a microprocessor which electronically converts units of volume or units of weight to units of energy.

DETAILED DESCRIPTION OF PREFERRED EMBODIMENTS

Figures 1, 2, 6:
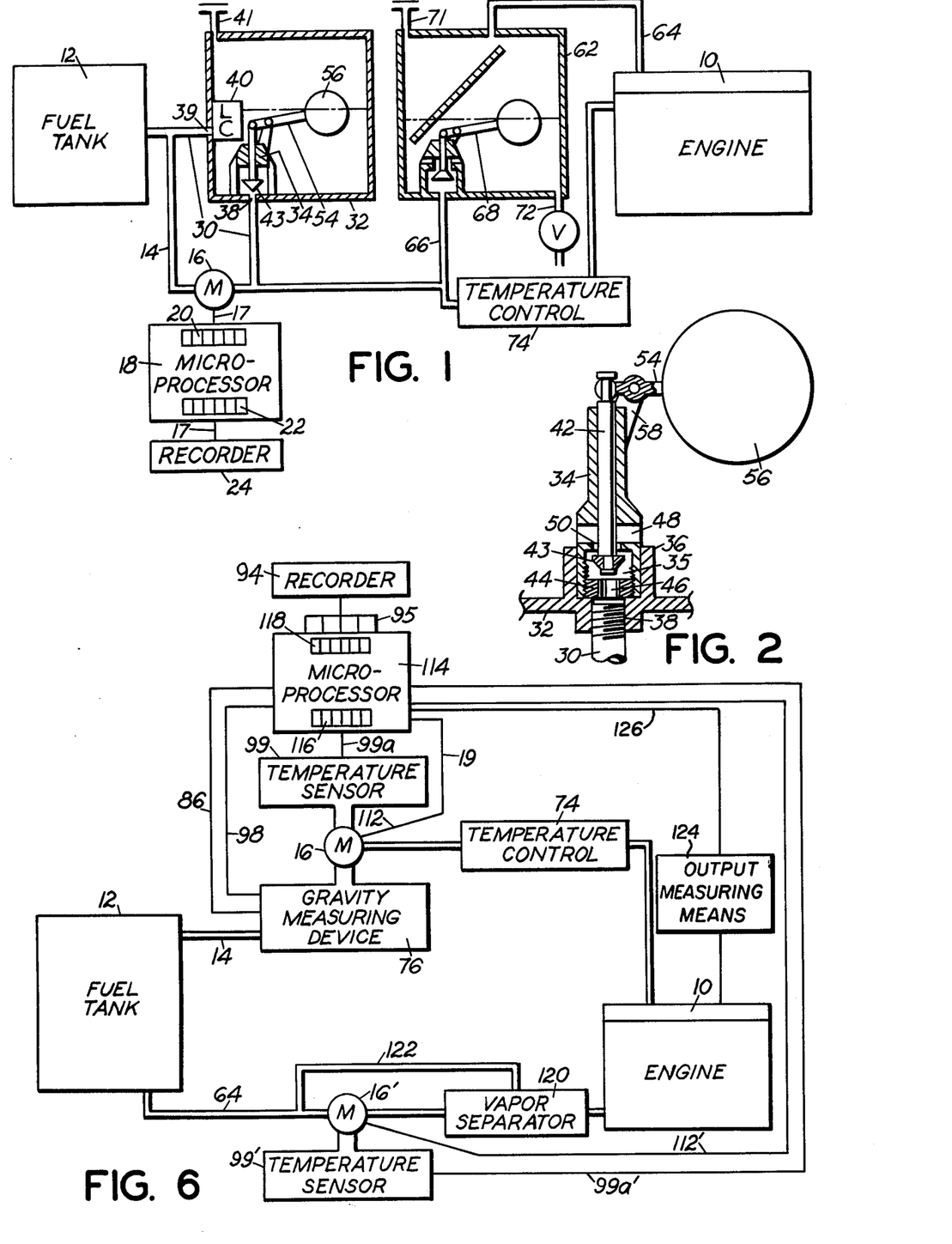
FIG. 1 is a diagrammatic view of a compensated measuring system embodying principles of the present invention which utilizes mechanically operated gravity compensating means.
FIG. 2 is an enlarged detailed sectional view of gravity compensating means employed in the embodiment of FIG. 1.
FIG. 6 is a diagrammatic view of a two meter fuel measuring system having means for measuring gravity changes to provide fuel usage output data compensated for such changes.

With particular reference to FIGS. 1 and 2, a first embodiment of the invention is illustrated which utilizes mechanical means for automatically compensating the volumetric measuring means for variations in the specific gravity of the fuel. In the system of FIG. 1, a conventional engine is designated by the numeral 10 and a conventional fuel tank is designated by the numeral 12. A fuel line 14 extends from the fuel tank to the engine.

Connected in the fuel line 14 is volumetric measuring means 16 of well known construction. Such a measuring means for example, may be of the type shown in applicant's U.S. Pat. No. 3,805,602, comprising a positive displacement type meter which upon reciprocation of movable member therein has an output of which an indicating means is responsive thereto. Electric circuitry 17 connects the measuring means with a microprocessor 18, of well-known construction and operation such as Motorola 6800 series microprocessor or Intel 8080 series microprocessor. Associated with the microprocessor is a readout 20 expressing the rate of weight of fuel flowing through the meter and also a readout 22 expressing a totalized weight of fuel consumed. The electronics also include an electrically operated recorder 24 of well known structure which makes a permanent record of fuel flow or usage.

A by-pass line 30 in the fuel line 14 extends around the measurement means 16 and has a reservoir 32 connected therein incorporating automatic mechanically operated compensating means which influences the measurement of the measure means 16 according to the variations in the specific gravity of the fuel, as will now be described.

A detail of the mechanically operated compensating means is shown in FIG. 2. Such compensating means comprises a valve holder 34 having a lower housing portion 35. The valve holder is supported in an upright position in the reservoir 32 by means of a mounting base 36 at an outlet opening 38 in the tank connected to by-pass line 30. The inlet 39 of the by-pass line 30 is associated with a pump and leveling inlet control mechanism (LC) 40 that is arranged to draw fuel from the fuel tank 12 and feed it to reservoir 32 as needed to maintain a constant level of fuel in the reservoir. The reservoir is vented at 41. A valve stem 42 is slidable in the valve holder 34, and its lower end supports a tapered valve 43 in the valve housing 35 arranged for engagement with an insert 44 in the housing having a vertical bore 46 the upper defining edge of which forms a seat for the valve 43. Insert 44 has threaded support in the holder 34 for adjustment toward and away from the valve 43.

A cross bore 48 is provided in the valve holder and such bore is in communication with the housing 35 by means of an opening 50 in the top of valve housing which receives the stem 42 therethrough but which is larger than the stem to provide for fluid flow. The rate of fuel flow through the bore 46 and thus through the by-pass line 30 is dependent upon positioning of valve 43 relative to its seat.

A lever arm 54 is pivotally connected at one of its ends to the top of stem 42 and has a float 56 secured to its opposite end. Lever arm 54 is pivotally supported between its ends by an arm 58 integral with the valve holder. A float 56 is secured to the free end of lever 54 whereby said float assumes a higher position when displacing a "heavier" fuel than when displacing a "lighter" one. The setting of the valve 43 in connection with the insert 44 is interrelated with the displacement of the float whereby as the specific gravity of a fuel increases and the float adjusts upwardly with relation to the fuel level, valve 43 will lower so that a lesser flow of fuel will move through the bypass line. Accordingly, with the measuring means calibrated to a certain reference, for example to a specific gravity of distilled water at 1.000 and at a temperature of 60° F., the measurement of fuel flow through the measuring means will be automatically compensated for by the valve 43. The valve is selectively positioned at the reference specific gravity and temperature so as to be able to adjust in both directions. Thus, if the specific gravity of the fuel is less than the reference at which the meter is calibrated, the float will adjust down relative to the fluid level in the tank and raise the valve to allow a greater by-pass of fuel. On the other hand if the specific gravity of the fuel is greater than the reference, the float will adjust up to decrease the flow. The above described operation of valve 43 provides for automatic compensation of volumetric flow through the measuring means 16 for changes in specific gravity of the fuel.

The present system may if desired be utilized with engines of the type which return unburned fuel, such as Diesel engines and for this purpose, a treatment apparatus or means 62 may be employed in the system. The numeral 64 designates a return fuel line from the engine extending to the top of the treatment means 62 for returning unburned fuel and the numeral 66 designates an outlet line from the bottom of the treatment means connected back into the fuel line 14 downstream from the by-pass line 30. Treatment means 62 is utilized for various purposes such as to remove bubbles and cool the return fuel. Furthermore, treatment means has a float operated valve mechanism 68 which maintains a selected level of fluid therein. The treatment means is suitably vented at 71 and has a valved cleanout 72. It may also be desirable to suppy the engine with a fuel of a selected or regulated temperature, and for this purpose a temperature control 74 is incorporated in the fuel line 14 downstream from the connection of outlet line 66 of the treatment means with the fuel line. The temperature control is of suitable conventional construction providing temperature sensing and means for heating or cooling the fuel. The temperature control or regulator may be associated with the microprocessor and related measurements of fuel usage to regulate the temperature of the fuel to the engine in accordance with desired fuel requirements.

Figure 3:
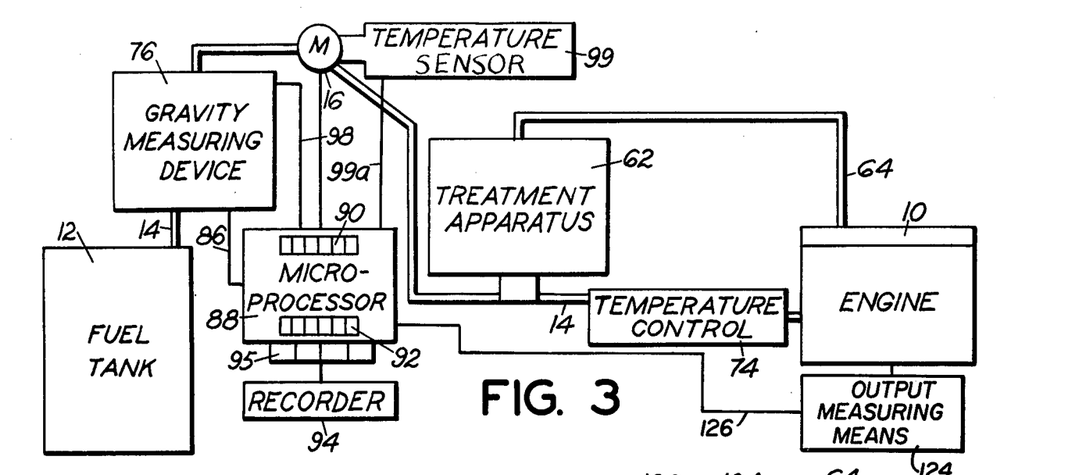
FIG. 3 is a diagrammatic view of another embodiment of the present measuring system, such system utilizing electrically operated gravity measuring means; to facilitate compensation for changes in gravity.
Figure 4:
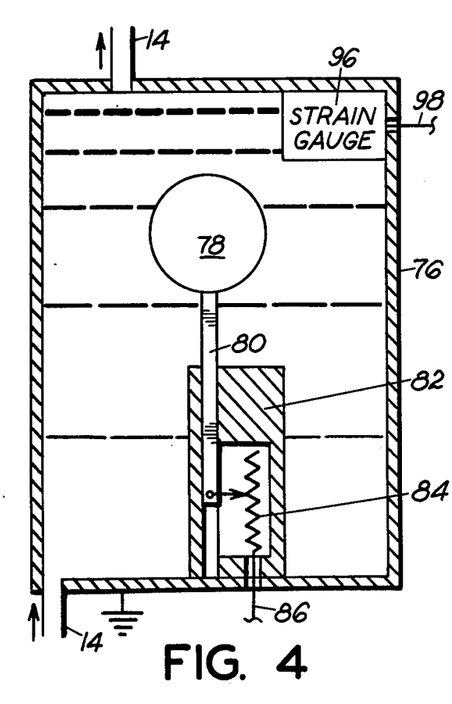
FIG. 4 is an enlarged detailed sectional view of gravity measuring means utilized in the embodiment of FIG. 3.

With particular reference to FIGS. 3 and 4, electrically operated gravity measuring means are utilized instead of the mechanical compensating means of FIGS. 1 and 2. The system is similar to that described in connection with FIG. 1 to the extent that it includes an engine 10, a fuel tank 12, a fuel line 14 between the fuel tank and the engine a volumetric measuring means 16, a treatment means 62 in a return line 64 from the engine and a temperature control 74 which may be associated with the microprocessor and related measurements of energy to regulate the temperature of the fuel to the engine in accordance with desired fuel requirements. The electrically operated measuring means includes a reservoir 76 connected in the fuel line 14 with the inlet of fuel being at the bottom of the reservoir and the outlet being at the top. The system of FIG. 3 is a closed system which allows the total fuel system to be a vacuum system which is preferred because it does not require the use of a pump apart from the engine fuel pump. However, it is to be understood that the fuel system can easily be modified to a pressure system.

With further reference to FIGS. 3 and 4, a float 78, has a stem 80 slidably supported vertically in a housing 82 secured to the bottom of the reservoir. The float 78, connected to the stem 80, operates electrical strain gauge 84 connected by circuitry 86 to a microprocessor 88 having readouts 90 and 92 for rate and total fuel usage, respectively. An electrically operated recorder 94 is also used in the system to make a permanent record of fuel usage. A group of digit switches 95 is associated with the microprocessor to manually preset the microprocessor for conversion formulae.

According to the embodiment of FIGS. 3 and 4, output of the strain gauge 84 functions in the microprocessor to automatically compensate the measurement of the volumetric measuring means 16 for variations in the gravity of the fuel. For example, with a fuel having a specific gravity which is less than the standard or reference of the meter, the measurement of the weight by the measuring means will be decreased according to the reduction in the specific gravity of the fuel. On the heavier specific gravity fuels, the reverse will be true.

In addition to corrections for specific gravity, it may also be desired to correct the measurement of the measuring means according to different atmospheric pressure relative to a selected reference. For this purpose, a pressure strain gauge 96 of well known structure is incorporated in the reservoir 76 and has electrical connection by circuitry 98 to the microprocessor. The processor is also programmed to correct the measurements of the measuring means 16 for variations in the pressure of the fuel as measured by the pressure strain gauge.

In addition to corrections for specific gravity and pressure variations the microprocessor can be supplied with information for subsequent compensation about changes in fuel temperature to facilitate compensation for changes in the volume of the fuel because of its volumetric expansion or contraction. For this purpose a temperature sensor 99 is associated with the measuring means 16 and gravity measuring means 76 and is connected electrically to microprocessor 88 by circuitry 99a.

A mathamatical relationship exists between specific gravity (S.G.) and A.P.I. gravity. A formula expressing this relationship is as follows:

$$\text{A.P.I. gravity} = (141.5/\text{S.G.}) - 131.5$$

The micro processor can readily convert specific gravity to A.P.I. gravity and vice versa.

A mathamatical relationship exists between gravity and energy consumed per unit weight of fuel consumed, for example:

For Diesel fuels, the formula is as follows:

$$\text{BTU/Pound} = 18,250 + \text{A.P.I. Gravity (40)}$$

or $$\text{BTU/Pound} = 18,250 + ([141.5/\text{S.G. at } 60°\text{ F.}] - 131.5)(40)$$

For Residual Fuels (Bunker Fuel) the formula is as follows:

$$\text{BTU/Pound} = 17,690 + (\text{A.P.I. Gravity})(58)$$

or $$\text{BTU/Pound} = 17,690 + ([141.5/\text{S.G. at } 60°\text{ F.}] - 131.5)(58)$$

These formulae are representative for Diesel and residual fuel, but obviously other formulae would apply to other types of fuel.

A formulation can readily be programmed into the memory (ROM=read only memory) section of the microprocessor to convert the volumetric measurement of fuel consumed energy units. An example expressing the total conversion is as follows:

The meter is calibrated by volume to measure in 1/10 pound increments referenced to water with a specific gravity of 1.000 at 60° F. For example, the meter is calibrated to approximately 2.77 cubic inches of volume per measured increment of consumption. This volume represents 1/10 pound of water at 60° F. as one gallon of water or 231 cubic inch of distilled water at 60° F. weighs 8.3378 pounds. The proportion formula is as follows:

$$\frac{231 \text{ cubic inches}}{8.3378 \text{ pounds}} = \frac{\text{Calibration volume}}{0.1 \text{ pound}}$$

Calibration volume = 2.77 cubic inch (approx)

An example of energy consumed is as follows:

(BTU) per given increment of fuel (0.1 pound corrected for the specific gravity of the fuel measured) for Diesel fuel with specific gravity fuel of 0.8500 at 60° F.

$$\frac{\text{BTU}}{(0.1)(.850)} = (18,250 + \left[\frac{(141.5)}{\text{S.G. at } 60°\text{ F.}} - 131.5\right](40)$$

$$\text{BTU} = \left[(18,250 + \left[\frac{(141.5)}{(0.850)} - 131.5\right](40)\right][(0.1)(.850)]$$

Energy consumed = BTU =
$$[(18,250 + (166.5 - 131.5)][(40)(0.0850)]$$
$$= [(18,250 + 35(40)][(0.0850)]$$
$$= [(18,250 + (1400)][(0.0850)]$$
$$= [19,650][(0.0850)]$$
Energy consumed = 1670 BTU The above formulations for BTU per pound are approximations and will give results generally within plus or minus 1.0 percent. In the formula the 0.1 pound increment of water must be corrected for the specific gravity of the fuel measured to convert the 0.1 pound of water increment to the weight of the fuel measured. Furthermore the formulae herein described are examples only and could be modified from time to time to reflect a more accurate result.

For an exact or extremely precise readout of energy consumed the microprocessor 18 is manually programmed with a precise measurement of fuel capability rather than a figure obtained through formulation.

Fuel capability can be accurately determined with a precision bomb calorimeter whereby the results may be in units of BTU per gallon at 60° F. or BTU per pound, or the like.

Fuel capability, for example 19,211 BTU per pound is introduced to the microprocessor 88 referred to in FIG. 3, in the form of four external digit switches or the number required for extremely accurate measurement. The microprocessor can be programmed to accept an external selected set of numbers such as fuel capability and interrelate this information with the measurement received from the volumetric measuring means 16. The resulting display 90, 92 or 94 would then indicate an exact measurement of energy consumed.

With reference to FIG. 6, another embodiment is shown. This system includes a fuel tank 12 and a fuel line 14 leading from the fuel tank to the engine 10. The engine is of the type that returns unburned fuel but the fuel system with which the invention is utilized is different to the extent that the return line 64 for unburned fuel is connected back into the fuel tank instead of into a treatment means in the fuel line. Since unburned fuel is returned to the fuel tank, the exact amount of fuel consumed by the engine will not be accurately measured by a single meter in the fuel line. Thus, volumetric measuring means 16 and 16' are connected in each of the fuel line 14 and return line 64, respectively, and the outputs of these two measuring means is connected to a microprocessor 114 by circuity 112 and 112' which in turn controls readouts 116 and 118 expressing rate and total fuel flow in units of weight or energy. With further reference to FIG. 6, a vapor separator 120 is included in the return fuel line prior to the measuring means 16', its function being to remove any air or vapor in the return fuel prior to measurement thereof. Vapor which is separated from the fuel is conducted around the measuring means 16' by a bypass conduit 122.

The compensating system of FIG. 6 employs a reservoir 76 in the fuel line 14 having an electrically operated strain gauge of the type shown in FIG. 4 incorporated therein. Reservoir 76 also has a pressure strain gauge 96 therein as in FIG. 4 having electrical connection by circuitry 98 to microprocessor 114. Measuring means 16 and 16' also have temperature sensing means 99 and 99'. Respectively, as in FIG. 3 incorporated in their respective surroundings and electrically connected to the microprocessor 114 by circuitry 99a and 99a', respectively. An electrically operated recorder 94 is electrically connected to the microprocessor to make a permanent record of fuel usage. This embodiment also has digit switches 95 associated with the microprocessor to manually preset the latter for conversion formulae.

According to the embodiment of FIG. 6, the outputs of the two measuring means 16 and 16' are fed to the microprocessor 114 where automatic compensation of each volumetric measuring means is performed. Compensation may be for specific gravity, pressure and or temperature as required for accurate weight or energy determination. Once required compensation is complete, the compensated measurement of measuring means 16' is substracted from compensated measurement 16. The resultant measurement in desired units of weight or energy may be selectively indicated on readouts 116, 118 or 94, or retained in memory for future use.

An example illustrating how weight or units of energy consumed is determined using two meters as described in FIG. 6 is as follows:

The gravity measuring device 76 forwards to the microprocessor the gravity of the fuel being measured. An increment of fuel measured from meter 16 calibrated in units of 0.1 pound of water is forwarded to microprocessor and therein is compensated for by the specific gravity measurement. The increment of weight measured by meter 16 compensated for by specific gravity is then held in memory in the processor. The temperature of the fuel is measured (which is approximately at ambient) by sensor 99 and forwarded to the microprocessor. (The temperature measured by sensor 99 must be at the identical temperature of the fuel volumetrically measured by measuring means 16 and at an identical temperature as measured by gravity measuring means 76 in order to achieve an accurate compensated measurement. Otherwise, other temperature compensation is required.)

The processor is programmed to utilize the specific gravity and temperature data measured to determine the coefficient of expansion of the fuel being measured. This is accomplished by comparison of data relating to specific gravity expansion characteristics held in memory in the processor. The processor now receives an increment of fuel from meter 16' at a fuel temperature sensed by sensor 99', (for example 160° F.) The increment of fuel so measured is compensated proportionately to reflect its reduced density by the fuel's coefficient of expansion. A corrected weight per increment of fuel measured by meter 16' is now held in memory.

The return flow corrected increment of weight is then subtracted from the input corrected increment whereby the net result is the weight of fuel consumed. Conversion to energy is as was illustrated with a single meter system described in the example following FIG. 3.

Further with reference to FIG. 6, it may also be desirable to supply the engine with a fuel of a selected or regulated temperature, and for this purpose a temperature control 74 is incorporated in the fuel line 14 downstream from the connection of meter 16 and in the fuel supply line. The temperature control is of a suitable conventional construction providing temperature sensing and means for heating or cooling the fuel. The temperature control or regulator may be associated with the microprocessor and related measurements of energy to regulate the temperature of the fuel to the engine in accordance with desired fuel requirements.

In the FIG. 6 embodiment, meters 16 and 16' could be associated with mechanical compensators of the type shown in FIG. 1 in lieu of the gravity measuring device 76 and temperature sensors 99 and 99', and also the gravity measuring device 76 may be included in the return line 64 rather than in the fuel supply line 14.

Figure 5:
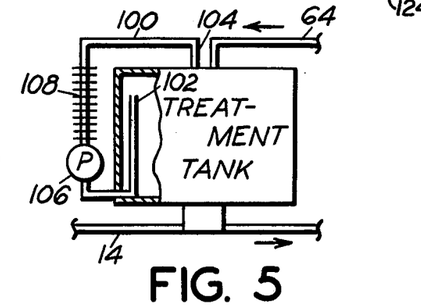
FIG. 5 is a fragmentary sectional view of fuel cooling means that may be used with either of the embodiments.

FIG. 5 illustrates cooling structure that may be utilized in the embodiments of FIGS. 1 and 3. Such cooling means comprises a circulating conduit 100 having an inlet end at the upper end of a standpipe 102 in the tank for receiving warm fluid from an upper portion of the tank and having an outlet 104 at the top of the tank. A pump 106 is included in the conduit 100 exteriorly of the tank and such conduit has a plurality of fins 108 which accomplish the cooling of liquid being circulated.

It is to be understood that the forms of my invention herein shown and described are to be taken as preferred examples of the same and that various other changes in the shape, size and arrangement of parts and various designations of units of measurement such as metric units may be restored to without departing from the spirit of my invention, or the scope of the subjoined claims. For example, the present invention can be related to combustion devices other than engines.

For example, specific fuel consumption may be determined and displayed if desired. An output from a dynamometer or other output measuring means, as designated by the numeral 124 in FIGS. 3 and 6, can be connected to the microprocessor by suitable circuitry 126 and a mathematical division process may be accomplished therein. The output or display would express the measurement in BTU's per Brake Horsepower Hour or the equivalent, which in any event is the efficiency of the fuel combustion means. In addition, measuring means 16 may comprise slow flow meters since this type of meter is relatively immune to changes in viscosity. Also the use of microprocessors in the embodiments is illustrative only since any well known computer may be used in addition, while the totalizing readout on the microprocessor is shown as a part thereof, it can be independent from the microprocessor or be a common readout if desired. Furthermore, the common readout of the microprocessor may be used to indicate temperature as sensed by the sensor 99 in the embodiment of FIG. 3 or selectively from the sensors 99 and 99' in the embodiment of FIG. 6. In addition, the use of strain gauges as illustrative in the embodiments of FIGS. 3 and 6 is illustrative only since any well known output adjustment means may be used. For example, a specific gravity or A.P.I. gravity device with millivolt output is available from Automation Products Incorporated of Houston, Texas. Furthermore, the gravity outputs may be obtained already temperature compensated which may if desired minimize the microprocessor load. Viscosity has an influence on the degree of slippage of the measuring means. This is not nearly as pronounced in positive displacement flow meters as opposed to turbine or inferential type flow meters. With applicant's slow flow meter as described in U.S. Pat. No. 3,805,602 the influence of viscosity is almost negligible. When applicable an appropriate viscosimeter can be incorporated in the system and connected to the microprocessor for subsequent compensation. Generally the gravity and the temperature of the fuel can be combined to form a viscosity compensating index which can be programmed into the microprocessor.

In addition temperature can have an expansion or contraction influence on the material utilized in the manufacture of the measuring chamber. To compensate for this variable the coefficient of expansion or an expansion index may be incorporated in the program of the microprocessor if desired to compute the true measurement of the measuring means.

Having thus described my invention, I claim:

1. A compensating measuring system for use with an engine having fuel supply means for supplying fuel to the engine and fuel return means for returning unburned fuel back to the fuel supply means, said system comprising
    (a) first volumetric measuring means measuring the fuel flow to the engine,
    (b) second volumetric measuring means measuring fuel flow returning from the engine,
    (c) first sensing means sensing the temperature of the fuel in the fuel supply means,
    (d) second sensing means sensing the temperature of the fuel returning from said engine,
    (e) gravity measuring means determining the gravity of the fuel in the system,
    (f) responsive means arranged to respond to the measurement of said two volumetric measuring means, to at least one of said sensing means and to said gravity measuring means and arranged to compensate said volumetric measurement for temperature and gravity,
    (g) and means arranged to provide a differential of the compensated measurements of the first and second volumetric measuring means.

2. The compensating measuring system of claim 1 including means converting said compensated volumetric differential to units of energy.

3. The compensating measuring system of claim 1 wherein said differential is expressed in units of weight.

4. The compensating measuring system of claim 3 including preset means arranged to convert said differential of compensated measurement in units of weight to units of energy in relation to the potential energy per unit of weight whereby said differential is expressed in units of energy.

5. The compensating measuring system of claim 1 combined with output measuring means and including means for converting the combined measurements to desired units of rate of flow.

6. The compensating measuring system of claim 1 including recording means in said system recording said differential.

7. The compensating measuring system of claim 1 wherein said responsive means also compensates for variations in the pressure of the fuel.

8. The compensating measuring system of claim 1 including temperature control means having means for connection in the fuel supply means regulating the temperature of the fuel supplied to the engine.

9. The compensating measuring system of claim 1 including indicating means indicating the temperature of the fuel sensed by at least one of said sensing means.

10. The compensating measuring system of claim 1 including present means arranged to convert said volumetric compensated measurement to units of energy in relation to the potential energy per volumetric increment of fuel.

11. A compensating measuring system for use with an engine having fuel supply means for supplying fuel to the engine, said system comprising
    (a) volumetric measuring means measuring the fuel flow to the engine,
    (b) pressure measuring means determining the pressure of the fuel in the fuel system,
    (c) gravity measuring means determining the gravity of the fuel in the system,
    (d) responsive means arranged to respond to the measurement of said volumetric measuring means, to said pressure measuring means and to said gravity measuring means and arranged to compensate said volumetric measurement for pressure and gravity,
    (e) and means expressing said compensated measurement in units of weight.

12. The compensating measuring system of claim 11 including conversion means converting said weight measurement to units of energy.

13. The compensating measuring system of claim 11 including temperature referenced conversion means converting said compensated measurement to units of energy.

14. A compensating measuring system for use with a fuel combustion means having fuel supply means for supplying fuel to the fuel combustion means and fuel return means for returning unburned fuel back to the fuel supply means, said system comprising
    (a) first volumetric measuring means measuring the fuel flow to the fuel combustion means,
    (b) second volumetric measuring means measuring fuel flow returning from the fuel combustion means,
    (c) first sensing means sensing the temperature of the fuel in the fuel supply means,
    (d) second sensing means sensing the temperature of the fuel returning from the fuel combustion means,
    (e) gravity measuring means determining the gravity of the fuel in the system,
    (f) responsive means arranged to respond to the measurement of said two volumetric measuring means, to at least one of said sensing means and to said gravity measuring means and arranged to compensate said volumetric measurement for temperature and gravity,
    (g) and means arranged to provide a differential of the compensated measurements of the first and second volumetric measuring means expressing said differential in units of energy.

15. A compensating measuring system for use with a fuel combustion means having fuel supply means for supplying fuel to the fuel combustion means, said system comprising
    (a) volumetric measuring means measuring the fuel flow to the fuel combustion means,
    (b) gravity measuring means determining the gravity of the fuel in the system,
    (c) responsive means arranged to respond to the measurement of said volumetric measuring means and to said gravity measuring means and arranged to compensate said volumetric measurement for variations in the gravity of the fuel,
    (d) temperature sensing means measuring the temperature of the fuel in said system, (e) and temperature referenced conversion means converting the compensated measurement of fuel for gravity to units of energy.

16. A compensated measuring system for use with a fuel combustion means having fuel supply means for supplying fuel to the combustion means, said system comprising
   (a) volumetric measuring means measuring the fuel flow to the fuel combustion means,
   (b) sensing means sensing the temperature of the fuel and having an output,
   (c) gravity measuring means determining the gravity of the fuel and having an output,
   (d) responsive means responding to said outputs of said gravity measuring means and said temperature sensing means and determining the expansion characteristics of the fuel, and further responding to said volumetric measuring means and compensating the volumetric measurement for said expansion characteristics,
   (e) and conversion means in said system converting said compensated volumetric measurement to gravimetric units.

17. The compensating measuring system of claim 16 wherein said conversion means is responsive to the output of said gravity measuring means, to the output of said temperature sensing means, and to said temperature compensated volumetric measurement.

18. The compensating measuring system of claim 16 including a measuring means for measuring the energy output of the combustion means and a ratio determining means determining a ratio of the gravimetric measurement and the energy output measurement of said combustion means.

19. A compensated measuring system for use with a fuel combustion means having fuel supply means for supplying fuel to the combustion means, said system comprising
   (a) volumetric measuring means measuring the fuel flow to the fuel combustion means,
   (b) sensing means sensing the temperature of the fuel and having an output,
   (c) gravity measuring means determining the gravity of the fuel and having an output,
   (d) responsive means responding to said outputs of said gravity measuring means and said temperature sensing means and determining the expansion characteristics of the fuel, and further responding to said volumetric measuring means and compensating the volumetric measurement for said expansion characteristics,
   (e) and conversion means in said system converting said compensated volumetric measurement to units of energy.

20. The compensating measuring system of claim 19 wherein said conversion means is responsive to the output of said gravity measuring means, to the output of said temperature sensing means, and to said temperature compensated volumetric measurement.

21. The compensating measuring system of claim 19 including a measuring means for measuring the energy output of the combustion means and a ratio determining means determining a ratio of the energy of the fuel supplied to the combustion means and the energy output measurement of said combustion means.

22. A compensated measuring system for use with a fuel combustion means having fuel supply means for supplying fuel to the combustion means, said system comprising
   (a) volumetric measuring means measuring the fuel flow to the fuel combustion means,
   (b) sensing means sensing the temperature of the fuel and having an output,
   (c) adjusting gravity input means arranged to receive a referenced gravity of the fuel and having an output,
   (d) responsive means responding to said outputs of said adjustable gravity input means and said temperature sensing means and determining the expansion characteristics of the fuel, and further responding to said volumetric means and compensating the volumetric measurement for said expansion characteristics,
   (e) and conversion means in said system converting said compensated volumetric measurement to gravimetric units.

23. The compensating measuring system of claim 22 wherein said conversion means is responsive to the output of said adjustable gravity input means, and to said temperature compensated volumetric measurement.

24. The compensating measuring system of claim 22 including a measuring means for measuring the energy output of the combustion means and a ratio determining means determining a ratio of the gravimetric measurement and the energy output measurement of said combustion means.

25. A compensated measuring system for use with a fuel combustion means having fuel supply means for supplying fuel to the combustion means, said system comprising
   (a) volumetric measuring means measuring the fuel flow to the fuel combustion means,
   (b) sensing means sensing the temperature of the fuel and having an output,
   (c) adjustable gravity input means arranged to receive a referenced gravity of the fuel and having an output,
   (d) responsive means responding to said outputs of said adjustable gravity input means and said temperature sensing means and determining the expansion characteristics of the fuel, and further responding to said volumetric measuring means and compensating the volumetric measurement for said expansion characteristics,
   (e) and conversion means in said system converting said compensated volumetric measurement to unit of energy.

26. The compensating measuring system of claim 25 wherein said conversion means is responsive to the output of said adjustable gravity input means and to said temperature compensated volumetric measurement.

27. The compensating measuring system of claim 25 including a measuring means for measuring the energy output of the combustion means and a ratio determining means determining a ratio of the energy of the fuel supplied to the combustion means and the energy output measurement of said combustion means.

28. A compensated measuring system for use with a fuel combustion means having fuel supply means for supplying fuel to the combustion means, and fuel return means for returning unburned fuel back to the fuel supply means, said system comprising
   (a) volumetric measuring means measuring the fuel flow to the fuel combustion means, (b) volumetric measuring means measuring the fuel returning from the combustion means, (c) sensing means sensing the temperature of the fuel supplied to the combustion means and having an output, (d) sensing means sensing the temperature of the fuel returning from the combustion means and having an output, (e) gravity measuring means determining the gravity of the fuel and having an output, (f) responsive means responding to said outputs of said gravity measuring means and at least one of said temperature sensing means and determining the expansion characteristics of the fuel, and further responding to said volumetric measuring means and compensating the volumetric measurements for said expansion characteristics, (g) means arranged to provide a differential of the compensated measurements of said volumetric measuring means, (h) and conversion means in said system converting said compensated differential measurement to gravimetric units.

29. The compensating measuring system of claim 28 wherein said conversion means is responsive to the output of said gravity measuring means, to the output of said temperature sensing means, and to said temperature compensated differential measurement.

30. The compensating measuring system of claim 28 including a measuring means for measuring the energy output of the combustion means and a ratio determining means determining a ratio of the gravimetric measurement of fuel consumed by the combustion means and the energy output measurement of said combustion means.

31. A compensated measuring system for use with a fuel combustion means having fuel supply means for supplying fuel to the combustion means, and fuel return means for returning unburned fuel back to the fuel supply means, said system comprising (a) volumetric measuring means measuring the fuel flow to the fuel combustion means, (b) volumetric measuring means measuring the fuel returning from the combustion means, (c) sensing means sensing the temperature of the fuel supplied to the combustion means and having an output, (d) sensing means sensing the temperature of the fuel returning from the combustion means and having an output, (e) gravity measuring means determining the gravity of the fuel and having an output, (f) responsive means responding to said outputs of said gravity measuring means and at least one of said temperature sensing means and determining the expansion characteristics of the fuel, and further responding to said volumetric measuring means and compensating the volumetric measurements for said expansion characteristics, (g) means arranged to provide a differential of the compensated measurements of said volumetric measuring means thereby providing a compensated measurement of the fuel consumed by the combustion means, (h) and conversion means in said system converting said compensated differential measurement to units of energy.

32. The compensating measuring system of claim 31 wherein said conversion means is responsive to the output of said gravity measuring means, to the output of said temperature sensing means, and to said compensated differential measurement.

33. The compensating measuring system of claim 31 including a measuring means for measuring the energy output of the combustion means and a ratio determining means determining a ratio of the fuel consumed by the combustion means in units of energy and the energy output measurement of said combustion means.

34. A compensated measuring system for use with a fuel combustion means having fuel supply means for supplying fuel to the combustion means, and fuel return means for returning unburned fuel back to the fuel supply means, said system comprising (a) volumetric measuring means measuring the fuel flow to the fuel combustion means, (b) volumetric measuring means measuring the fuel returning from the combustion means, (c) sensing means sensing the temperature of the fuel supplied to the combustion means and having an output, (d) sensing means sensing the temperature of the fuel returning from the combustion means and having an adjustable output, (e) adjustable gravity input means arranged to receive a referenced gravity of the fuel and having an output, (f) responsive means responding to said outputs of said adjustable gravity input means and at least one of said temperature sensing means and determining the expansion characteristics of the fuel, and further responding to said volumetric measuring means and compensating the volumetric measurements for said expansion characteristics, (g) means arranged to provide a differential of the compensated measurements of said volumetric measuring means thereby providing a compensated measurement of fuel consumed by the combustion means, (e) and conversion means in said system converting said compensated differential measurement to gravimetric units.

35. The compensating measuring system of claim 34 wherein said conversion means is responsive to the output of said adjustable gravity input means, and to said temperature compensated volumetric measurement.

36. The compensating measuring system of claim 34 including a measuring means for measuring the energy output of the combustion means and a ratio determining means determining a ratio of the gravimetric measurement of the fuel consumed by the combustion means and the energy output measurement of said combustion means.

37. A compensated measuring system for use with a fuel combustion means having fuel supply means for supplying fuel to the combustion means, and fuel return means for returning unburned fuel back to the fuel supply means, said system comprising (a) volumetric measuring means measuring the fuel flow to the fuel combustion means, (b) volumetric measuring means measuring the fuel returning from the combustion means, (c) sensing means sensing the temperature of the fuel supplied to the combustion means and having an output, (d) sensing means sensing the temperature of the fuel returning from the combustion means and having an output,
(e) adjustable gravity input means arranged to receive a referenced gravity of the fuel and having an output,
(f) responsive means responding to said outputs of said adjustable gravity input means and at least one of said temperature sensing means and determining the expansion characteristics of the fuel, and further responding to said volumetric measuring means and compensating the volumetric measurements for said expansion characteristics,
(g) means arranged to provide a differential of the compensated measurements of said volumetric measuring means,
(e) and conversion means in said system converting said compensated differential measurement to units of energy.

38. The compensating measuring system of claim 37 wherein said conversion means is responsive to the output of said adjustable gravity input means and to said temperature compensated volumetric measurement.

39. The compensating measuring system of claim 37 including a measuring means for measuring the energy output of the combustion means and a ratio determining means determining a ratio of the fuel consumed by the combustion means in units of energy and the energy output measurement of said combustion means.

40. A measuring system for use with a fuel combustion means whereby the combustion means is adapted to receive fuel to be consumed and convert the fuel into usable energy, said measuring system comprising
(a) first means for volumetrically measuring the fuel consumed by the combustion means,
(b) second means for compensating the volumetric measurement of consumed fuel for gravity and temperature variations,
(c) third means for converting the compensated volumetric measurement into units of energy,
(d) fourth means for measuring the energy output of the combustion means,
(e) and fifth means responsive to said third and fourth means for providing a ratio of the inputs from said third and fourth means.

41. A measuring system as recited in claim 40 wherein the third means continuously measures the energy of the fuel, said fourth means continuously measures the energy produced by the fuel, and said fifth means continuously provides the ratio.

* * * * *